United States Patent [19]
Brown et al.

[11] Patent Number: 5,974,636
[45] Date of Patent: Nov. 2, 1999

[54] SOFT GOODS FASTENER

[75] Inventors: Bryan M. Brown, East Amherst; John S. Canna, Orchard Park; Curt J. Mahlstedt, East Aurora, all of N.Y.

[73] Assignee: Fisher-Price, Inc., East Aurora, N.Y.

[21] Appl. No.: 09/165,206

[22] Filed: Oct. 2, 1998

Related U.S. Application Data

[63] Continuation of application No. 08/736,109, Oct. 24, 1996, abandoned.

[51] Int. Cl.$^6$ .................................................. A44B 21/00
[52] U.S. Cl. ............................ 24/615; 24/695; 297/218.1
[58] Field of Search ............................ 24/615, 614, 604, 24/588, 265 R, 265 EC, 265 BC, 695, 694, 698.2, 114.5, 3.12, 3.1, 72.5, 308, 335, 336, 163 K, 457; 297/218.2, 218.3, 218.5, 219.12, 440.11, 440.2, 228.13; 280/47, 38

[56] References Cited

U.S. PATENT DOCUMENTS

| | | |
|---|---|---|
| 1,340,284 | 5/1920 | Murray . |
| 1,709,181 | 4/1929 | Matlock . |
| 2,041,624 | 5/1936 | Samuel . |
| 2,074,036 | 3/1937 | Ward . |
| 2,184,650 | 12/1939 | Roseman . |
| 2,988,791 | 6/1961 | Strehlein . |
| 3,050,805 | 8/1962 | Clyne . |
| 3,162,919 | 12/1964 | Shee . |
| 3,392,426 | 7/1968 | Mathison et al. . |
| 3,992,853 | 11/1976 | Morris . |
| 4,435,882 | 3/1984 | Unger . |
| 4,462,607 | 7/1984 | Nakao et al. . |
| 4,757,854 | 7/1988 | Rippberger . |
| 5,005,903 | 4/1991 | Minardi . |
| 5,054,170 | 10/1991 | Otrusuina . |
| 5,146,656 | 9/1992 | Huang . |
| 5,201,535 | 4/1993 | Kato et al. . |
| 5,366,271 | 11/1994 | Johnston et al. . |
| 5,380,067 | 1/1995 | Turvill et al. . |
| 5,393,122 | 2/1995 | Andrisin, III . |
| 5,401,075 | 3/1995 | Venuto et al. . |
| 5,478,134 | 12/1995 | Bernard et al. . |
| 5,482,352 | 1/1996 | Leal et al. . |
| 5,582,463 | 12/1996 | Linder et al. . |
| 5,584,105 | 12/1996 | Krauss . |
| 5,584,106 | 12/1996 | Anscher . |
| 5,586,807 | 12/1996 | Taggart . |
| 5,604,958 | 2/1997 | Anscher . |

FOREIGN PATENT DOCUMENTS

| | | |
|---|---|---|
| 0 466 446 | 1/1992 | European Pat. Off. . |
| 1 460 034 | 1/1969 | Germany . |

OTHER PUBLICATIONS evenflo Joy Ride Travel System, assembly instructions, p. 3, 1996.
ITW Nexus Product Catalog, 1987, p. 10.

Primary Examiner—James R. Brittain
Assistant Examiner—Robert J. Sandy
Attorney, Agent, or Firm—Morgan, Lewis & Bockius LLP

[57] ABSTRACT

An apparatus and method for securely and releasably attaching load-bearing soft goods to a frame without requiring the use of tools for attachment and detachment is disclosed. A connection mechanism, or buckle, that is comprised of a first, male connector portion and a second, female connector portion is provided. The male connector, which is fixedly secured to the soft good, is releasably received within the female connector, which is fixedly secured to the frame, in order to releasably attach the soft good to the frame. The male connector contains a thin, rectangular attachment tab that provides for fixedly attaching the soft good to the male connector. The female connector is directly secured to the frame, such as by riveting. By fixedly securing one portion of the connection mechanism to the frame for mating with another portion, it is obvious to the user where the attachments of the soft good to the frame are to be made. The attached soft good can support the weight of a child occupant and can only be detached from the frame by applying a force that is directed to decoupling the buckle. Several buckles are disposed around the periphery of the soft good and the frame in order to adequately support the soft good.

12 Claims, 6 Drawing Sheets

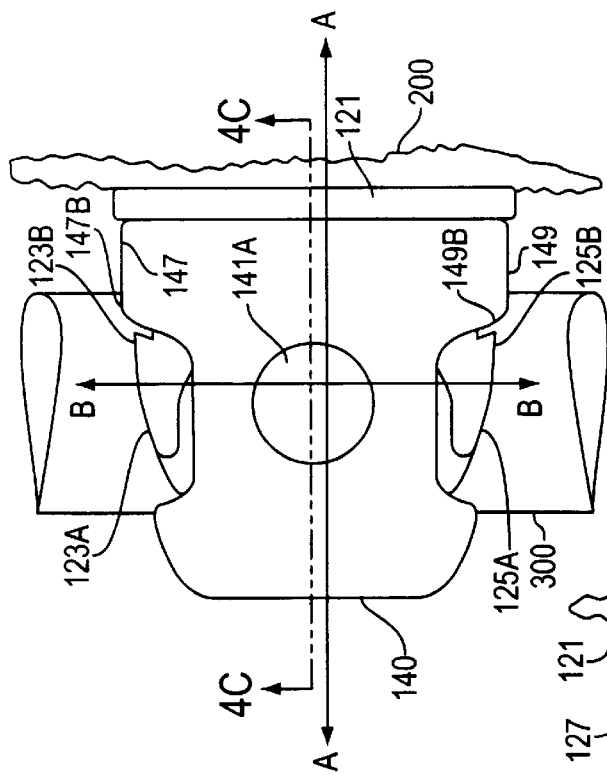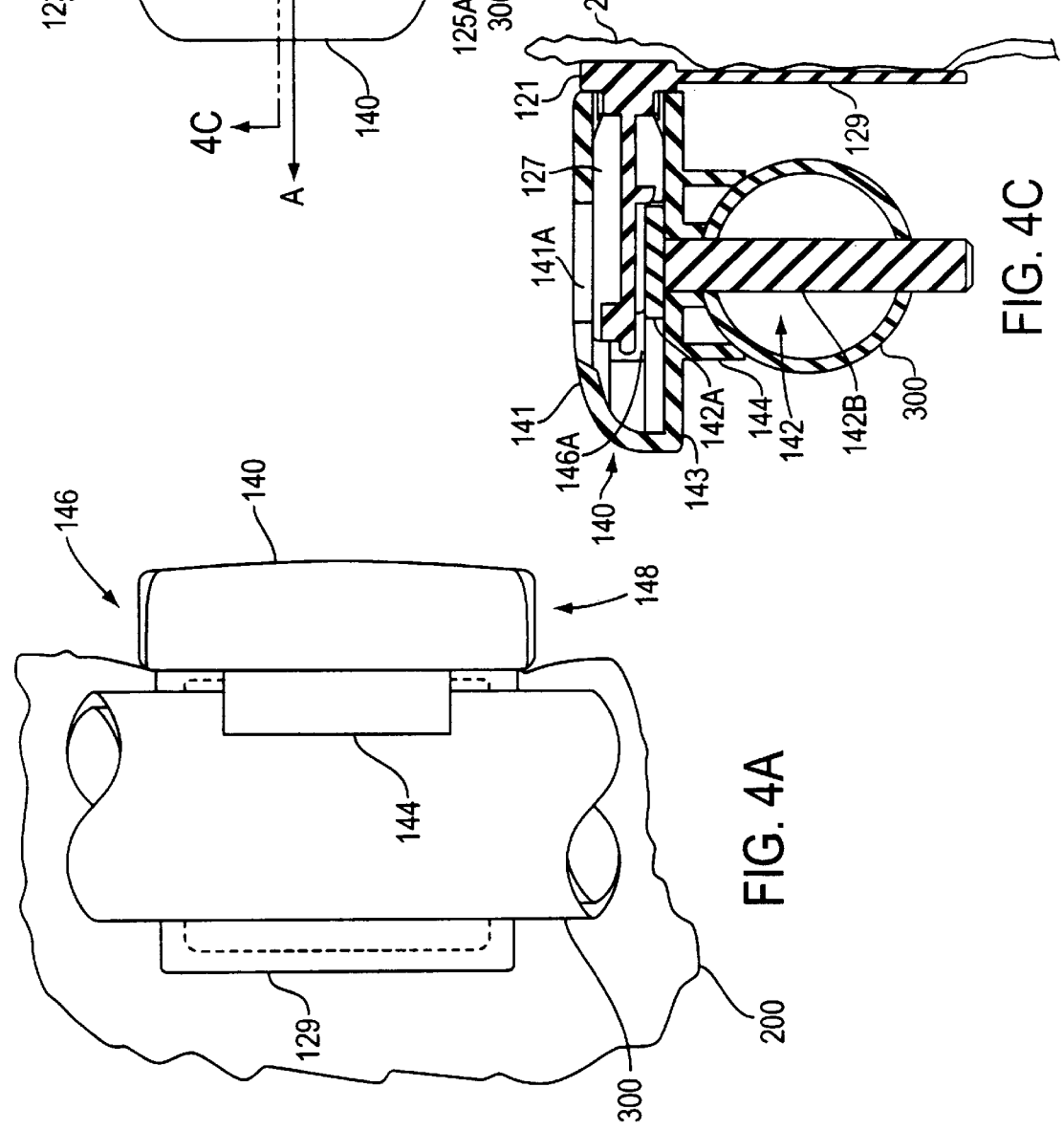

SOFT GOODS FASTENER

This is a continuation of copending application Ser. No. 08/736,109 now abandoned filed on Oct. 24, 1996.

BACKGROUND OF THE INVENTION

The present invention relates to a connection mechanism for fastening soft goods (e.g. the fabric for the seat of a stroller) to a support structure (e.g. the stroller frame). More specifically, the invention relates to an apparatus and method for securely and releasably attaching soft goods to a frame such that the soft goods, when attached to the frame, are able to function as a load-bearing surface and yet be easily removable from, and attachable to, the frame.

A variety of children's products, such as strollers, playpens, car seats, etc. have structural frameworks that are formed of metal tubing or molded plastic and have child support seating areas that are formed by, or lined with, fabric. Typically, the fabric of the seating area, whether the fabric actually forms the seating area or just covers the seating area, is manufactured separately from the framework of the product and is therefore required to be attached to the framework.

A variety of devices are known for attaching soft goods to a frame. Devices, such as rivets, can be utilizesd to securely fasten soft goods to a frame, however, these devices do not allow for removal of the soft goods for laundering or other purposes.

Other devices are known for removably attaching soft goods to frame structures, however, these devices suffer drawbacks as well.

U.S. Pat. No. 5,482,352 to Leal et al. discloses a soft good cover that is attached to a car seat frame by standard snap fasteners. The female portion of the fastener is attached to the soft good and the male portion is directly secured to the car seat frame. The snap fasteners are provided along the periphery of the soft good and the seat to attach the cover to the seat. The patent also discloses that other attachment means, such as belts, elastic straps, or ties may be used to attach the soft good to the seat.

U.S. Pat. No. 5,005,903 to Minardi discloses a standard hook and loop fastener to attach a cushion to a car seat where one portion of the fastener is attached to the soft good and the other portion may be glued or secured by other similar means to the car seat frame itself.

U.S. Pat. No. 5,366,271 to Johnston et al. discloses pad eyes in the frame of an infant seat that are designed to receive buttons provided on a cushion for removably attaching the cushion to the frame.

Another known technique for attachment of a soft good to a cylindrical frame includes a clip that is semi-circular in configuration and is designed to be releasably attached directly to a frame member by snap-fitting the semi-circular clip around the frame. The clip contains an integrally molded, thin rectangular tab that extends from the body portion of the clip to which the soft good product may be sewn. In this manner, a soft good is directly secured to a clip and the clip is releasably attachable to a frame to secure the soft good to the frame.

All of these various attachment mechanisms, i.e. ties, belts, elastic straps, hook and loop fasteners, snaps, clips, etc., have utility in applications where a liner, cushion, or any other type of soft good is required to be removably attached to a frame and where the frame or an additional securing mechanism bears the load applied to the soft good. Thus the attachment mechanisms described above merely attach the soft good to the frame. These devices are not suitable for securing soft goods to a frame where the soft goods alone are required to support a load. If these types of devices were used in the load-bearing context, the load, or weight of the child in the child apparatus context, could act to detach the attachment device from the frame and the child could be harmed by inadvertent detachment of the attachment device.

An additional drawback with attachment devices such as the clip described above is that since the clip is totally self-contained, i.e. no part of the attachment device is fixedly secured to the frame for mating with a second part, the clip can be attached at any location on the frame. Thus, the attachment mechanism itself provides no guidance to the user for determining where on the frame to secure the clip in order to ensure proper positioning of the soft good to the frame.

Additional types of fastening devices are known that are able to support the weight of a child occupant, however, these devices also suffer drawbacks that are solved by the present invention.

U.S. Pat. No. 5,393,122 to Andrisin, III discloses a stroller seat back recline mechanism where the seat back's angle of inclination is able to be adjusted by looping a web extension that is attached to the top of the seat back at different positions within a slotted buckle fastener that is directly secured to the stroller frame. Whereas the frictional connection between the web and the slot, to a limited extent, is able to support the weight of a child occupant and whereas it also serves to attach the soft good seat back to the stroller frame at one location, the connection does not provide for ease in removing the soft good from the stroller frame. The connection is not intended for this purpose and does not provide this functionality. Additionally, should this type of connection be used for the sole purpose of attaching soft goods to a frame, the frictional threaded web and slot connection between the soft good and the slotted buckle is susceptible to working itself loose due to the lack of a positive, mechanical interlock between the soft good and the buckle. Loosening of the connection between the soft good and the frame, where the soft good is supporting a child occupant, could result in harm to the child.

A final known technique for securing a load-bearing soft good to a frame is to provide web attachments to the periphery of the soft good which are then wrapped around the frame and fastened directly to the frame by using, for example, screws. However, securing the webbing directly to the stroller frame does not provide for ease in detaching and reattaching the soft good to the frame. Tools are required to detach and reattach the soft goods and, additionally, reattaching the soft goods is made even more difficult for the user because, similar to the positioning drawbacks discussed previously for the clip, the proper relative positioning of the webs to the frame is not obvious to the user.

Therefore, it would be beneficial to have a connection mechanism that securely attaches load-bearing soft goods to a frame, provides for a positive, mechanical interlock between the soft goods and the frame that requires an act directed to decoupling the connection for detaching the soft goods, and that allows for ease in detaching, reattaching and positioning the soft goods on the frame without requiring tools.

SUMMARY OF THE INVENTION

The drawbacks of the known soft good attachment devices are overcome by the present invention which includes an apparatus and method for securely attaching soft goods to a frame. Through use of the present invention, load-bearing soft goods can be securely and releasably attached to a frame without requiring the use of tools for attachment and detachment.

The connection mechanism has particular utility in the child apparatus context because the soft goods associated with these types of apparatuses, when attached to the frame of the apparatus, must be able to securely support the weight of a child occupant and also should be removable from the frame structure due to their susceptibility to being soiled by the child. By providing for ease in detaching the soft good from the frame, the soft good can be laundered or replaced when soiled.

In accordance with the present invention there is provided a connection mechanism, or buckle, that is comprised of a first, male connector portion and a second, female connector portion. The male connector, which is fixedly secured to the soft good, is releasably received within the female connector, which is fixedly secured to the frame, in order to releasably attach the soft good to the frame. Several buckles are disposed around the periphery of the soft good and the frame in order to adequately support the soft good.

The male connector contains a thin, rectangular attachment tab that provides for fixedly attaching the soft good to the male connector. The soft good may be fixedly attached to the attachment tab of the male connector through any of a variety of means, one of which is by stitching the soft good to the tab, so long as the attachment provides for a secure, fixed attachment of the soft good to the male connector.

The female connector is fixedly secured to the frame of the apparatus to which the soft good is to be attached. By fixedly securing one portion of the connection mechanism to the frame for mating with another portion, it is obvious to the user where the attachments of the soft good to the frame are to be made. Again, any attachment means can be utilized to secure the female connector to the frame so long as the attachment provides for a secure, fixed attachment of the female connector to the frame. For both the male and female connector attachments to the soft good and the frame, respectively, the connections are able to support the loads that are applied to the soft good, such as by the weight of a child occupant.

To secure the soft good to the frame, the male connectors of the buckles are inserted into the female connectors. Each male connector contains two flexible arms that are received within the female connector. Each flexible arm contains a camming surface and a shoulder. When the flexible arms are inserted into the female connector, the end walls of the female connector act as a cam on the camming surface of the arms to force the arms inward so that the arms can be inserted into the female connector. When the flexible arms are fully inserted into the female connector, the cam of the female connector no longer interacts with the camming surface on the arms of the male connector and thus the flexible arms spring outward to fixedly and mechanically interlock the shoulders of the male connectors with corresponding shoulders on the female connector.

The mechanical interlocking of the male and female shoulders prevents decoupling of the buckle. The buckle can only be decoupled by manually depressing the male flexible shoulders inward toward each other, on an axis perpendicular to the mating axis of the male and female connectors, to disengage the male shoulders from the female shoulders. Once the male and female shoulders have been disengaged, the male connector can be removed from the female connector along the mating axis.

In this manner, soft goods can be securely and releasably attached to a frame. The soft goods can support the weight of a child occupant and can only be detached from the frame by applying a force that is directed to decoupling the buckle. By fixedly securing one portion of the connection mechanism to the frame for mating with another portion, it is obvious to the user where the attachments of the soft good to the frame are to be made. A conventional buckle that is familiar to the user is utilized which provides for ease in attaching and detaching the soft goods from the frame without requiring the use of tools.

BRIEF DESCRIPTION OF THE DRAWINGS

FIGS. 4A and 4B are front and top views of the assembled connection mechanism of the present invention showing the frame and the soft good secured to the connectors.

FIG. 4C is a cross-sectional view of the connection mechanism taken along the line 4C—4C of FIG. 4B.

DETAILED DESCRIPTION

Figure 1:
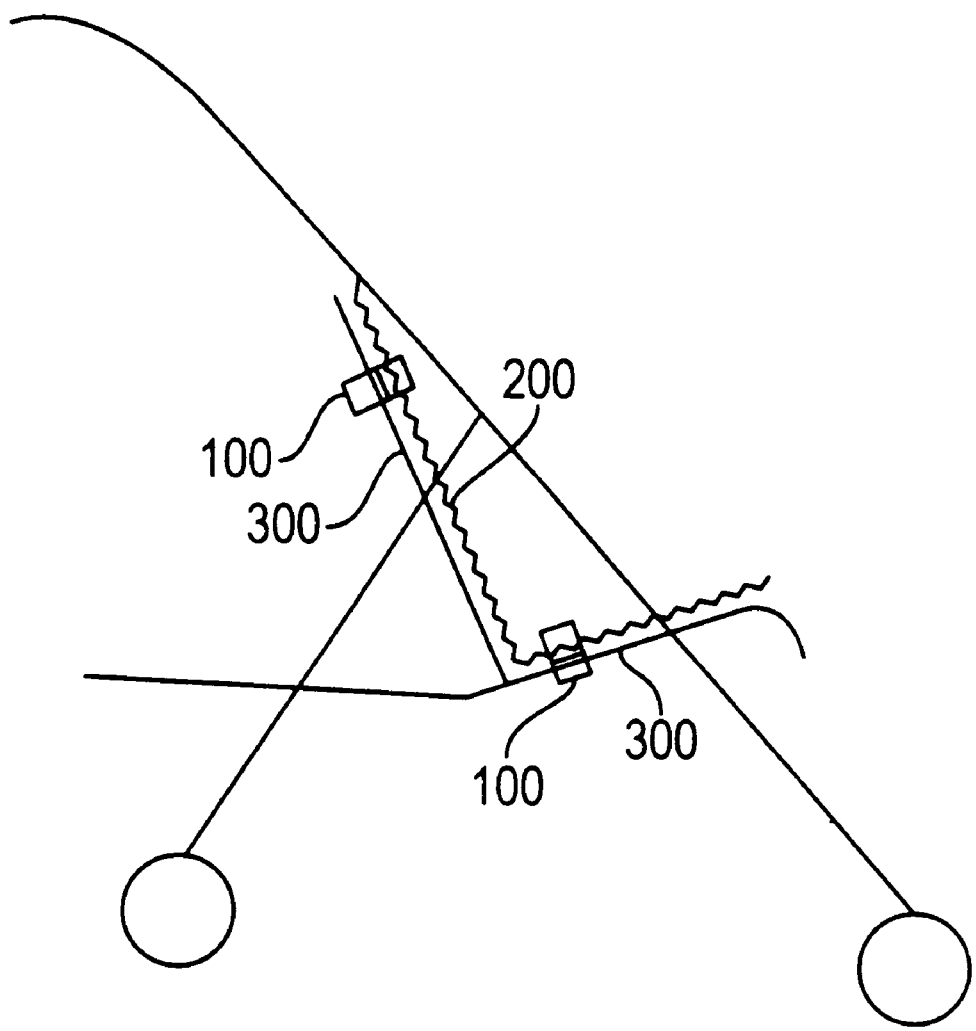
FIG. 1 shows the connection mechanism of the present invention as used in the context of a stroller.

As illustrated in FIG. 1, the connection mechanism 100, or buckle, of the present invention is shown in the context of a stroller. Buckle 100 securely and releasably secures a soft good 200, which in this illustration is the fabric that comprises the seating surface of the stroller, to the stroller frame 300.

Whereas connection mechanism 100 is illustrated as a particular buckle design in the disclosed embodiment, as will be discussed later, it may be any of a variety of devices that are known to releasably and securely connect one article to another.

As shown in FIGS. 2A–2C and 3A–3F, buckle 100 is comprised of a first, male connector portion 120 and a second, female connector portion 140, respectively.

Figure 2C:
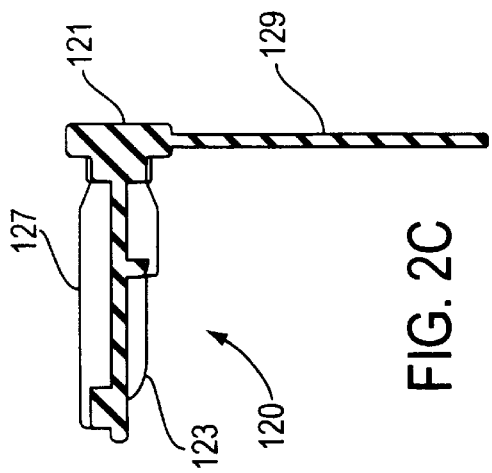
FIG. 2C is a cross-sectional view of the male connector taken along the line 2C—2C of FIG. 2B.
Figure 2B:
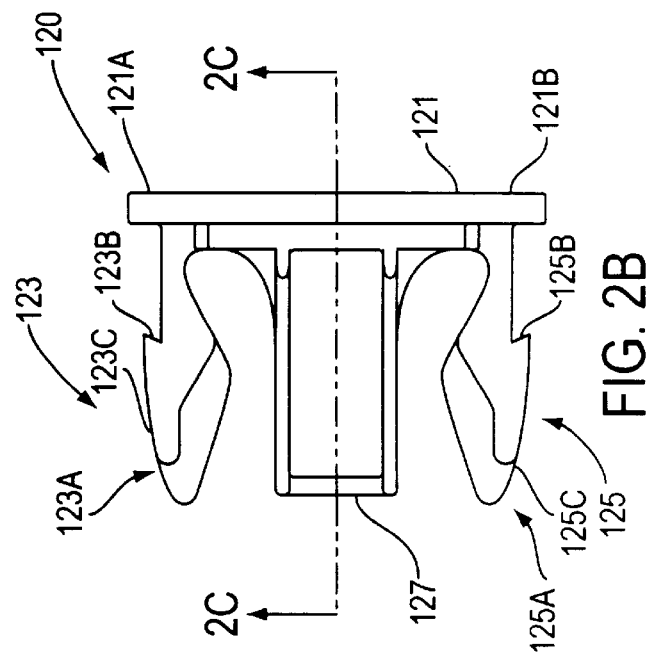
FIG. 2B is a top plan view of the male connector.
Figure 2A:
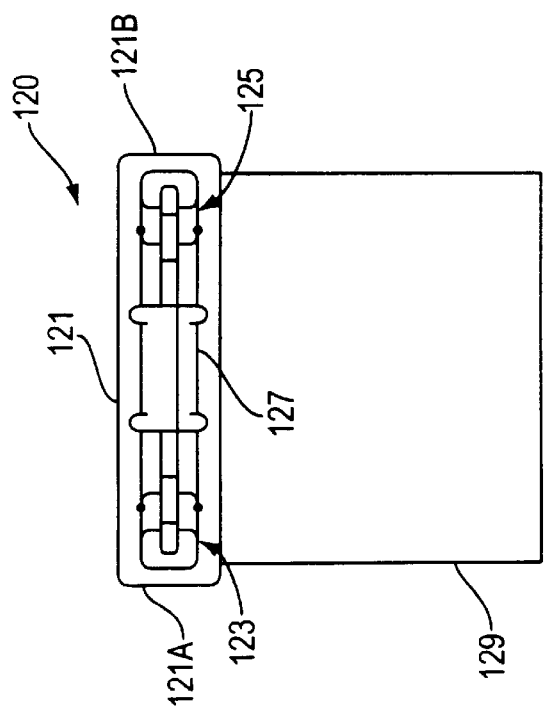
FIG. 2A is a front elevational view of the male connector of the present invention.
Figure 3A:
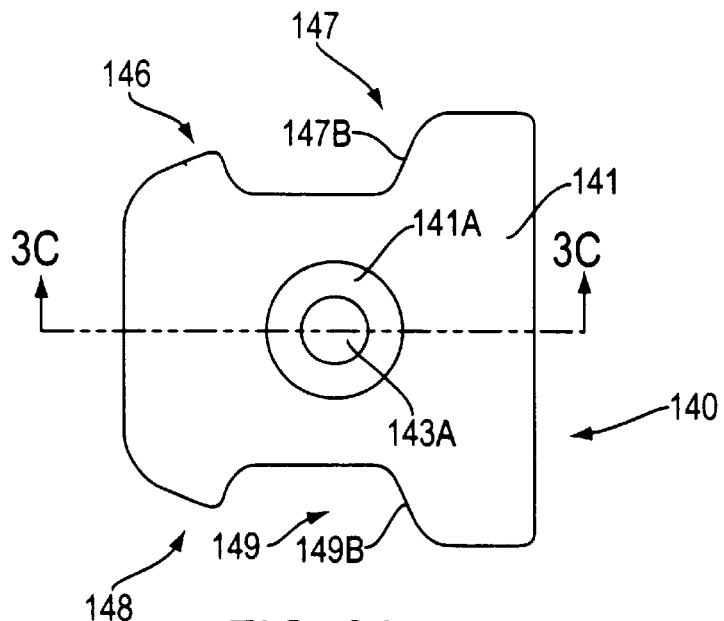
FIG. 3A is a top plan view of the female connector of the present invention.
Figure 3B:
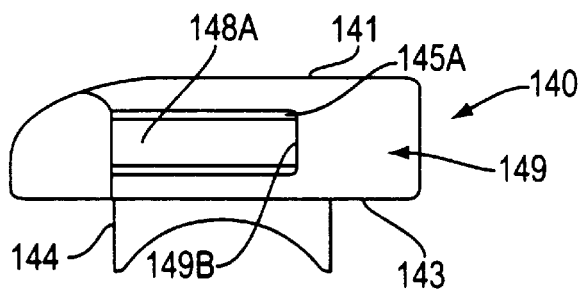
FIG. 3B is a left side elevational view of the female connector.
Figure 3C:
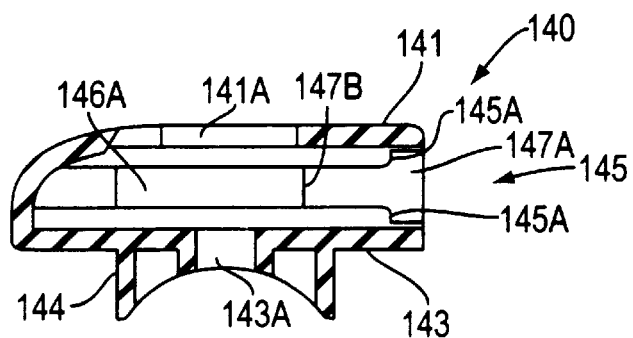
FIG. 3C is a cross-sectional view of the female connector taken along the line 3C—3C of FIG. 3A.
Figure 3D:
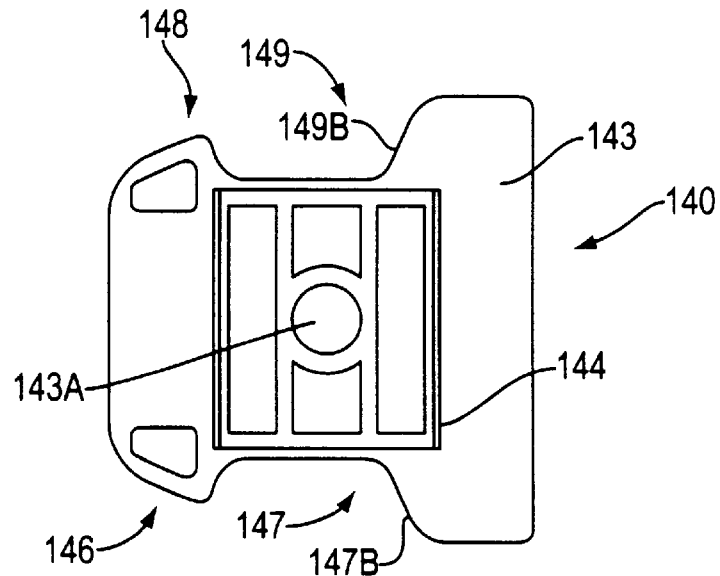
FIGS. 3D, 3E, and 3F are bottom, front, and rear views of the female connector.
Figure 3E:
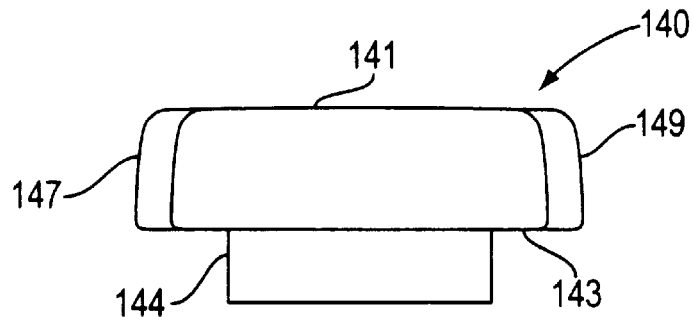
Figure 3F:
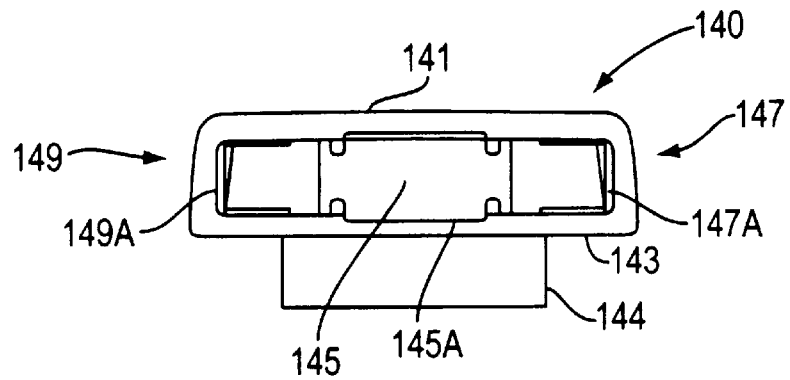
Figure 5A:
FIGS. 5A–5E illustrate alternative connection mechanisms that may be employed in the present invention.
Figure 5D:
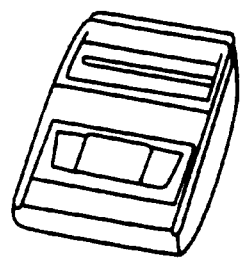
Figure 5B:
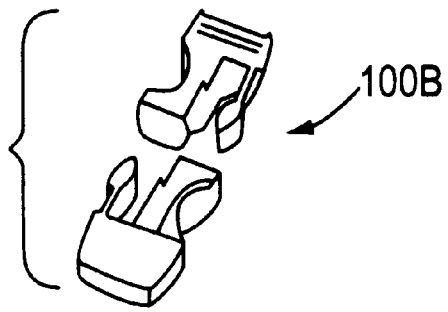
Figure 5E:
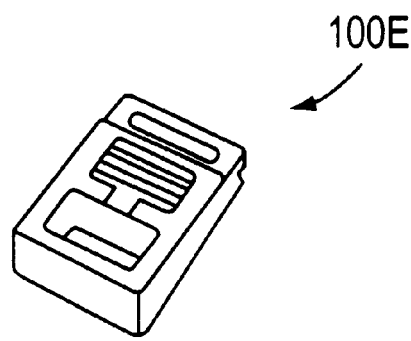
Figure 5C:
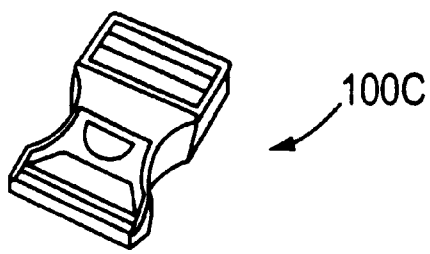

Referring to FIGS. 2A–2C, male connector 120 contains a base 121, two flexible arms 123, 125, a center guide portion 127, and a tab 129. Extending from ends 121A and 121B of base 121 are flexible arms 123, 125. Flexible arms 123, 125 each contain a head portion 123A, 125A, shoulders 123B, 125B, and camming surfaces 123C, 125C. Flexible arms 123, 125 and center guide portion 127 are received within female connector portion 140 to positively, mechanically interlock male connector 120 to female connector 140, as will be described.

Extending from base 121 of male connector 120 is attachment tab 129. Tab 129 extends perpendicular to flexible arms 123, 125. As such, tab 129 extends perpendicular to the mating axis of male connector 120 and female connector 140. Tab 129 is provided as the attachment point for fixedly securing soft good 200 to male connector 120. In the disclosed embodiment, tab 129 is integrally formed with base 121 and is comprised of a thin, polymeric material that is sufficiently thin such that soft good 200 is able to be stitched to tab 129. It is desirable to provide for stitching of soft good 200 to tab 129 so that the manufacturing process that is utilized for securing soft good 200 to tab 129 is the same as that utilized for constructing soft good 200, which is most likely stitching. Utilizing the same manufacturing process for both constructing the soft good and securing the soft good to the male connector allows for production efficiency. In the illustrated embodiment, tab 129 (and the male and female connector portions) are formed of nylon and the tab has a thickness of 0.040 inches.

FIGS. 3A–3F show second, female connector portion 140. As can be seen, female connector 140 contains upper surface 141, lower surface 143, and male connector receiving aperture 145. Extending from lower surface 143 is a boss 144 that is used to position female connector 140 with respect to stroller frame 300. In the disclosed embodiment, boss 144 is integrally formed with lower surface 143 and is formed such that it provides a surface that is contoured to snugly mate with cylindrical frame 300. On both upper surface 141 and lower surface 143, apertures 141A and 143A, respectively, are provided. Apertures 141A, 143A are provided to receive a securing device 142, disclosed as a rivet (not shown in FIGS. 3A–3F), for fixedly securing female connector 140 to frame 300. Aperture 141A is slightly larger than aperture 143A because aperture 141A must receive the rivet head 142A through it whereas aperture 143A must only receive rivet post 142B. As can be seen in FIG. 4C, rivet 142 is inserted through apertures 141A and 143A where it then extends through frame 300 to fixedly secure frame 300 to female connector 140 on boss 144. By fixedly securing female connector 140 to frame 300 for mating with male connector 120, it is obvious to the user where the attachments of soft good 200 to frame 300 are to be made.

Female connector 140 also includes end walls 146, 148, each of which contains apertures 146A and 148A, respectively, and guide portion 145A. End walls 146 and 148 also contain engagement portions 147, 149, respectively. Engagement portions 147, 149 include camming surfaces 147A, 149A, respectively, and shoulders 147B, 149B, respectively. Engagement portions 147, 149 are utilized to provide a positive, mechanical interlock between male connector 120 and female connector 140, as will be explained. Guide portion 145A receives center guide portion 127 of male connector 120 when male connector 120 is inserted into female connector 140 and aids in the proper positioning of the male connector with respect to the female connector.

To positively interlock male connector 120 to female connector 140, male connector 120 is inserted into female connector 140 along first, mating axis A as shown in FIG. 4B. Flexible arms 123, 125 and center guide portion 127 of male connector 120 are inserted into male connector receiving aperture 145 of female connector 140. As mentioned previously, center guide portion 127 of male connector 120 is received within guide portion 145A of female connector 140 to assist in properly positioning male connector 120 within female connector 140.

Since the interaction of flexible arms 123, 125 of male connector 120 and engagement portions 147, 149 of female connector 140 is the same for both arms and engagements portions, only the interaction of one set of these structures will be described. As male connector 120 is inserted into female connector 140, camming surface 123C of flexible arm 123 comes into contact with camming surface 147A of female connector 140 to force arm 123 inward so that the arm, which extends slightly wider than male connector receiving aperture 145, may be received within aperture 145. As arm 123 continues to be inserted into aperture 145, camming surface 123C of arm 123 extends beyond camming surface 147A of female connector 140 such that the camming surfaces are no longer in contact, thereby permitting arm 123 to spring outward which positions head portion 123A of arm 123 within aperture 146A of end wall 146 of female connector 140. When head portion 123A of arm 123 is positioned within aperture 146A of end wall 146, shoulder 123B of male connector 120 is securely interlocked with shoulder 147B of female connector 140 to positively, mechanically interlock the male connector to the female connector. The positively interlocked male and female connectors can be seen in FIGS. 4B and 4C.

In order to disengage male connector 120 from female connector 140, a force that is manually applied by the user, is directed against head portions 123A, 125A to force them inward toward each other along a second axis B that is perpendicular to mating axis A. By forcing head portions 123A, 125A toward each other a distance sufficient to disengage shoulders 123B, 125B of arms 123, 125 from shoulders 147B, 149B of end walls 146, 148, male connector 120 can be retracted from female connector 140 along axis A. Through use of the present invention, male connector 120 cannot be disconnected from female connector 140 unless a force specifically directed to decoupling the connectors is applied. As such, the interconnection between soft good 200 and frame 300 can support load-bearing soft goods and yet still provide for an easily releasable connection between the soft good and the frame.

Therefore, in operation, in order to secure soft good 200 to frame 300 several buckles 100 of the present invention are utilized. A plurality of male connectors 120 and female connectors 140 are disposed around the periphery of soft good 200 and frame 300, respectively, such that load-bearing soft good 200 is adequately supported when the connectors are connected. When positioning soft good 200 on frame 300, the user positions soft good 200 on frame 300 such that male connectors 120 are positioned adjacent female connectors 140. To secure soft good 200 to frame 300, male connector 120, with soft good 200 fixedly attached by stitching soft good 200 to integrally formed attachment tab 129, is positively coupled with female connector 140, with frame 300 fixedly attached, by inserting male connector 120 into female connector 140 and interlocking shoulders 123B, 125B with 147B, 149B, respectively. FIGS. 4A–4C show soft good 200 attached to frame 300. As can be seen, the longitudinal axis of frame 300 extends perpendicular to mating axis A of male connector 120 and female connector 140 and also lies parallel with attachment tab 129. In this configuration, the forces applied to buckle 100 that are due to the load-bearing soft good, are normal to the mating axis of the male and female connectors, thus providing an even more secure connection between the soft good and the frame since forces normal to the mating axis will not tend to try to decouple the connectors.

To remove soft good 200 from frame 300, as described previously, a force is applied inward along axis B to disengage shoulders 123B, 125B from shoulders 147B, 149B, whereupon male connectors 120 can be removed from female connectors 140. Thus, soft good 200 can be removed from frame 300.

As was discussed previously, the disclosed embodiment illustrates connection mechanism 100 as a particular buckle design, however, various types of buckles and other securing devices may be utilized with the present invention. Additionally, whereas the connection mechanism is disclosed as a nylon buckle, the connection mechanism may be formed of other materials as well. For example, a metal connection mechanism could be utilized. FIGS. 5A–5E illustrate alternative buckles 100A, 100B, 100C, 100D and 100E that may be incorporated. In deciding on a particular connection mechanism, some factors that should be considered are the degree to which the connection mechanism provides a positive, mechanical interlocking interface between connecting portions and the ease with which the connection between the soft good and the frame can be made by a consumer. Additionally, the soft good to frame connection should be one that does not require tools for either attachment or detachment. Selection of a mechanism that is already familiar to the user, e.g. the same as that used for the seat back adjust mechanism or the seat belt as disclosed in patent application serial number 08/304,663, will add to the user-friendliness of the connection.

With respect to fixedly securing female connector 140 to frame 300, a rivet 142 is disclosed, however, other securing devices can be utilized. For example, self-tapping screws, bolts, welding, or an in could be-molded connector and frame could be utilized to secure the connector to the frame. Any suitable securing means that is compatible with the material that comprises the connection mechanism can be utilized. However, the securing means that is chosen to secure the connector to the frame should be a high strength, reliable, and easy to manufacture/install connection.

The disclosed embodiment for securing female connector 140 to frame 300 also includes boss 144 which snugly positions connector 140 with frame 300, however, use of a boss is not required in the disclosed embodiment, nor is it required in any embodiment of the present invention. Boss 144 assists in providing a secure connection to frame 300, however, a secure connection can be obtained without use of a boss. Additionally, boss 144 provides particular utility in the context of the cylindrical frame member as disclosed herein, however, the invention may be practiced in applications where non-cylindrical framing members, e.g. flat, planar members, are utilized and thus a boss as disclosed would not be desired.

With respect to securing soft good 200 to male connector 120, an attachment tab 129 is utilized and soft good 200 is sewn to tab 129. However, other methods of fixedly securing a soft good to a connector could be utilized. A tab as disclosed is not required. For example, a web extension could be provided on the soft good that is then looped through a slot on the connector and stitched back onto itself. The method that is chosen, however, should be reliable, secure, inexpensive and easy to manufacture.

Several additional variations on the disclosed embodiment are contemplated. Whereas the invention is disclosed in the context of a stroller, the invention can be utilized in any number of devices where load-bearing soft goods are required to be releasably and securely attached to a framing member. Other contexts in which the invention could be utilized are child swings, playpens, bouncers, walkers, and child seats, among others. Additionally, male connector 120 is disclosed as being fixedly connected to soft good 200 and female connector 140 as being fixedly connected to frame 300. However, male connector 120 may be secured to frame 300 and female connector 140 may be secured to soft good 200. In this reversed configuration, boss 144 would be provided on male connector 120 and tab 129 would be provided on female connector 140.

What is claimed is:

1. An apparatus for supporting a child occupant, comprising:
    a support structure having a rigid frame member;
    soft goods having a seating surface upon which the child occupant can be seated; and
    a connector releasably coupling said soft goods to said frame member, said connector including:
        a male connector portion fixedly secured to one of said soft goods and frame member and defining an engagement direction parallel to the longitudinal axis of said male portion; and
        a female connector portion fixedly secured to the other of said soft goods and frame member and releasably connectable to said male portion;
        wherein said male portion includes a resilient latch coupleable with said female portion in a positive interlocking engagement upon insertion of said male portion into said female portion in the engagement direction and wherein said male and female portions can be disengaged from each other by applying digital pressure to said resilient latch.

2. The apparatus of claim 1 wherein said male portion is fixedly secured to said soft goods and said female portion is fixedly secured to said frame structure, wherein said male portion further includes a tab for fixedly securing said load-bearing soft good to said male portion and said female portion includes a boss for positioning said support structure on said female portion.

3. The apparatus of claim 2 wherein said tab is integrally formed with said male portion and said boss is integrally formed with female said portion.

4. The apparatus of claim 1, wherein said male portion is fixedly secured to said soft goods and said female portion is fixedly secured to said frame structure, wherein said frame member is cylindrical and said female portion includes a boss having an arcuate portion with a radius approximately equal to that of said cylindrical frame member, said female portion being fixed to said frame member with said arcuate portion of said boss adjacent said frame member.

5. An apparatus for supporting a child occupant comprising:
    a support structure having a rigid frame member;
    soft goods having a seating surface upon which the child occupant can be seated; and
    a connector releasably coupling said soft goods to said frame member, said connector including:
        a male connector of a buckle fixedly secured to said soft goods; and
        a female connector of a buckle fixedly secured to said frame member and releasably connectable to said first portion;
        wherein said male connector is releasably received within said female connector;
        wherein said male and female connectors further include a shoulder such that upon insertion of said male connector into said female connector, said male and female shoulders positively interlock to prevent said male connector from being disconnected from said female connector unless said male shoulder is manually disengaged from said female shoulder; and
        wherein said male connecter is received in said female connector on a first axis and said male shoulder is manually disengaged from said female shoulder by applying a force to said male shoulder on a second axis perpendicular to said first axis to disengage said male shoulder from said female shoulder.

6. The apparatus of claim 5 wherein said male connector and said female connector each have two shoulders that positively interlock.

7. The apparatus of claim 5 wherein the longitudinal axis of said frame member is perpendicular to said first axis.

8. An apparatus for supporting a child occupant comprising:
   a support structure having a rigid frame member;
   soft goods having a seating surface upon which the child occupant can be seated; and
   a connector releasably coupling said soft goods to said frame member, said connector including:
      a first portion fixedly secured to said soft goods; and
      a second portion fixedly secured to said frame member and releasably connectable to said first portion;
      wherein said first portion further includes a tab for fixedly securing said load-bearing soft good to said first portion and said second portion includes a boss for positioning said support structure on said second portion;
      wherein said soft goods are stitched to said tab and said second portion is riveted to said frame member.

9. An apparatus for supporting a child occupant, comprising:
   a support structure having first and second laterally spaced, elongate, rigid frame members;
   soft goods having a seating surface upon which the child occupant can be seated, said soft goods being disposable between, and suspendable from, said first and second frame members; and
   means for releasably coupling said soft goods to said support structure, said coupling means including:
      a first portion fixedly secured to a portion of said soft goods disposable adjacent to a respective one of said frame member; and
      a second portion fixedly secured to a respective one of said frame members,
      said first and second portions being configured to remain connected while supporting the portion of the weight of the child occupant transmitted from said soft goods through said coupling means to said frame members,
      wherein each of said first portions further includes a tab for fixedly securing said soft goods to said first portion and each of said second portions further includes a boss for positioning said second portion on a respective one of said frame members, wherein said soft goods are stitched to said tab and each of said second portions is riveted to a respective one of said frame members.

10. A method for releasably attaching a fabric seating surface to a frame member of a support structure of a child supporting apparatus and supporting the fabric seating surface and a child occupant of the seating surface in part from the supporting structure, comprising the steps of:
   securing a first portion of a connector to the seating surface;
   securing a second portion of a connector to one of the support frames;
   disposing the seating surface adjacent the support frame with said first and second connector portions adjacent each other;
   releasably coupling said first and second portions of said connector to releasably secure the seating surface to the frame member; and
   releasing said seating surface from said frame member by applying digital pressure to one of said first and second connector portions.

11. The method of claim 10 wherein:
   said first connector portion is a male connector of a buckle;
   said second connector portion is a female connector of a buckle;
   wherein said male connector is releasably received within said female connector; and
   wherein said male and female connectors further include a shoulder such that upon insertion of said male connector into said female connector, said male and female shoulders positively interlock to prevent said male connector from being disconnected from said female connector unless said male shoulder is manually disengaged from said female shoulder.

12. The method of claim 10 wherein said first connector portion further includes a tab for fixedly securing said load-bearing soft good to said first connector portion and said second connector portion includes a boss for positioning said support structure on said second connector portion.

* * * * *